Figure 1:
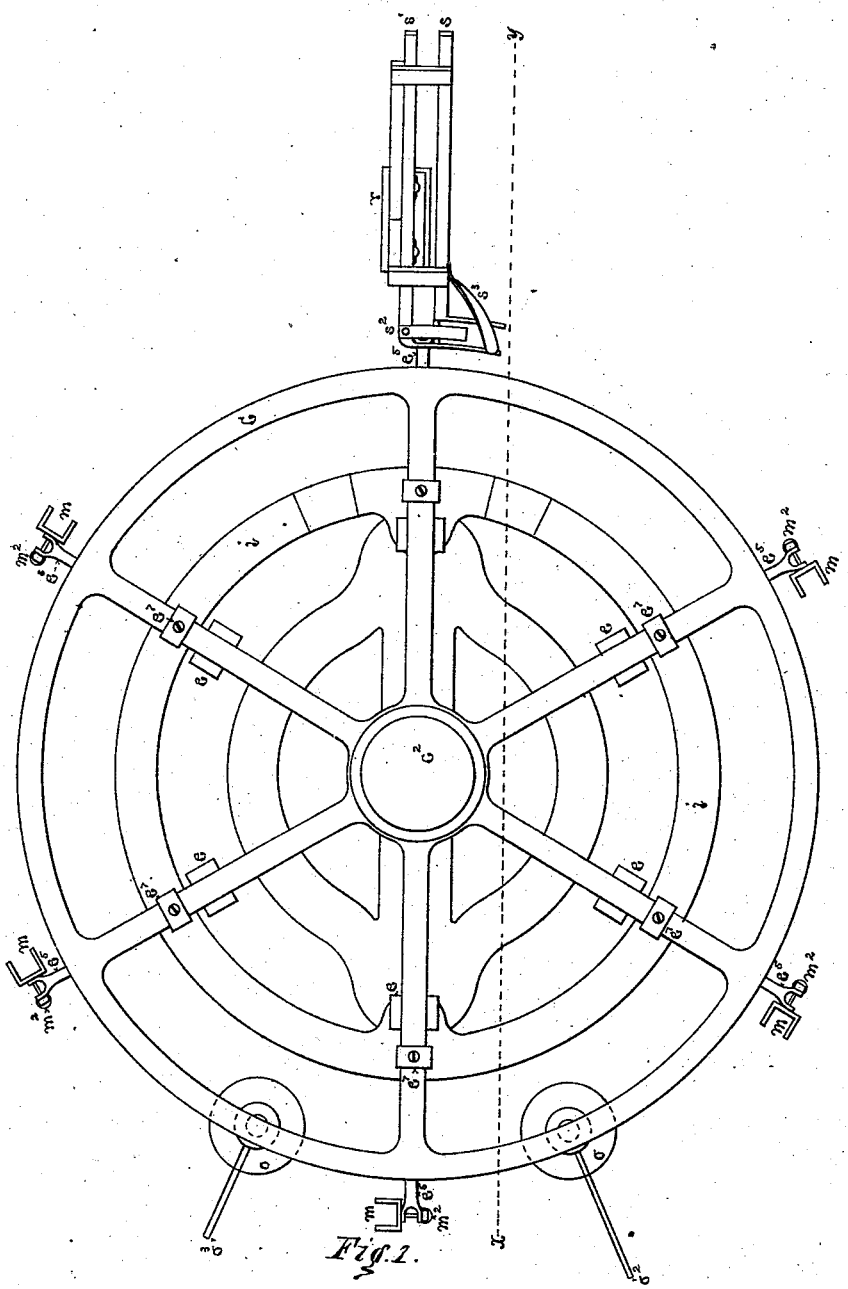

(No Model.)

P. BUTLER.

MACHINE FOR WEIGHING AND ASSORTING CARTRIDGES.

No. 294,363.　　　　　　　　　　Patented Mar. 4, 1884.

Witnesses　　　　　　　　　　Inventor (No Model.) 3 Sheets—Sheet 2.
P. BUTLER.
MACHINE FOR WEIGHING AND ASSORTING CARTRIDGES.
No. 294,363. Patented Mar. 4, 1884.
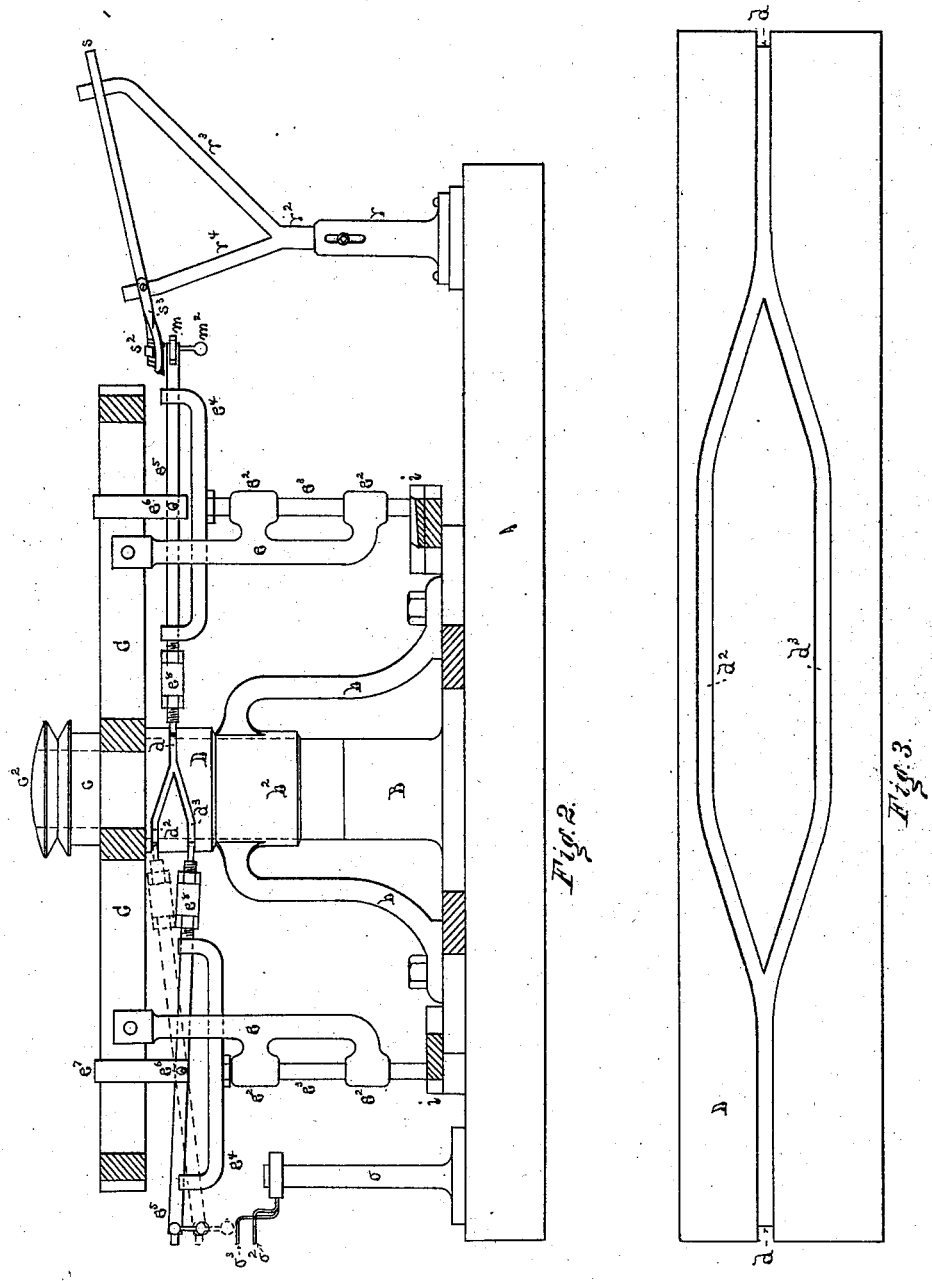

(No Model.)  3 Sheets—Sheet 3.
P. BUTLER.
MACHINE FOR WEIGHING AND ASSORTING CARTRIDGES.
No. 294,363. Patented Mar. 4, 1884.
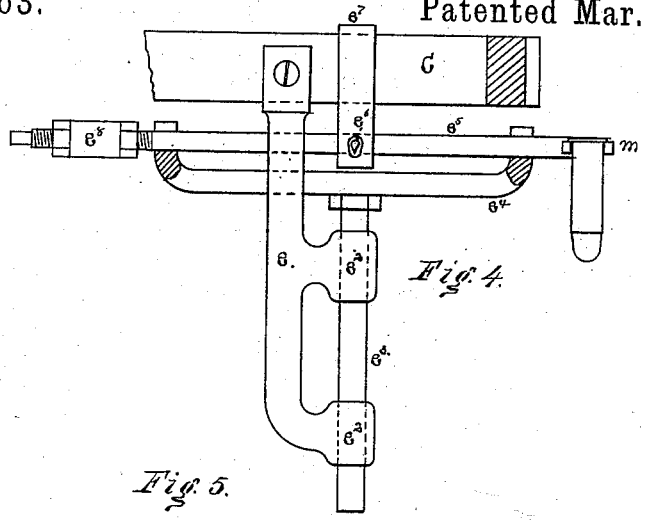
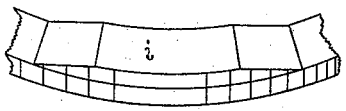
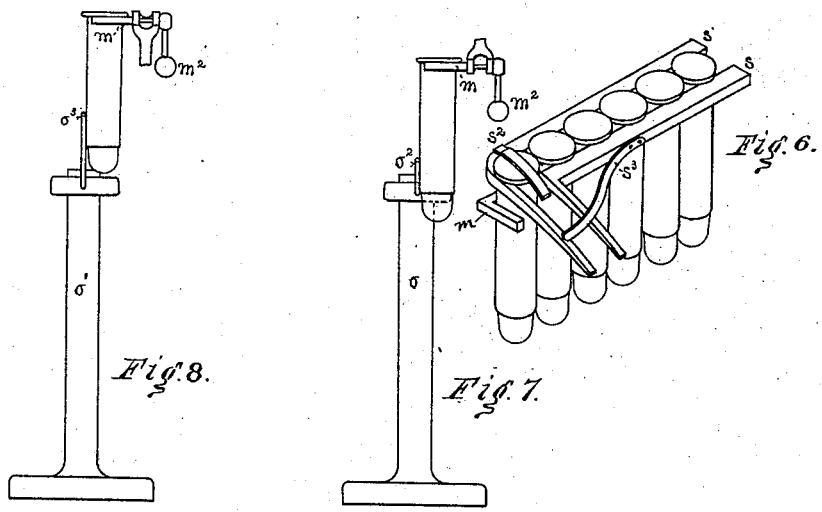

UNITED STATES PATENT OFFICE.

PAUL BUTLER, OF LOWELL, MASSACHUSETTS.

MACHINE FOR WEIGHING AND ASSORTING CARTRIDGES.

SPECIFICATION forming part of Letters Patent No. 294,363, dated March 4, 1884.

Application filed October 18, 1883. (No model.)

*To all whom it may concern:*

Be it known that I, PAUL BUTLER, of Lowell, in the county of Middlesex and State of Massachusetts, have invented a new and useful Improvement in Machines for Weighing and Assorting Cartridges, of which the following is a specification.

My invention relates to weighing-machines; and it consists in a novel combination of parts for adapting such a machine to the automatic weighing and assorting of cartridges for fire-arms, substantially as hereinafter described.

It is well known that in the use of modern fire-arms great accuracy is required in the weight of the bullet and charge of powder in the cartridge-case to produce accurate shooting. As it is impossible to obtain perfect accuracy in these particulars in the manufacture of metallic cartridges, it becomes necessary to weigh and assort them when finished, and reject those which fail to come up to the proper standard. To do this weighing and assorting quickly and accurately is the object of my present invention.

In the drawings, Figure 1 is a top plan view of my improved weighing-machine. Fig. 2 is a vertical section through the working parts on the line $x\ y$ of Fig. 1. Fig. 3 is a side view of the guide-collar by itself, which contains the double cam-groove for separating and assorting cartridges of different weights. Fig. 4 is an enlarged view of the pivoted balance for weighing the cartridge. Fig. 5 is a separate view of the shape of the elevated part of the track or groove on which the support rests for lifting the scale-beam off its pivot, and by which this support is elevated at the proper moment, as hereinafter described. Fig. 6 is a view of the slide or hopper into which the cartridges are fed to the machine. Figs. 7 and 8 are views of the posts and stops which discharge the cartridges from the machine.

A, Fig. 2, is the base of the machine. On this base is bolted a metal standard, B, strengthened and steadied by braces $b\ b$, which are firmly bolted at their lower ends, and connected to a sleeve, $b^2$, fitting closely around the standard. Above the sleeve $b^2$ the standard B projects in the form of a round post or pivot into and through the wheel or disk C, which takes its bearing and revolves upon this pivot. This pivot is capped by a sleeve, $c$, attached to wheel C, which terminates at the top in a driving-pulley, $c^2$, designed to give motion to it and the wheel by a cord passed around in its groove from any suitable driving mechanism.

Between the wheel C and the sleeve $b^2$ is attached to the latter or the post B, or both, a sleeve or collar, D, having upon its circumference the groove $d$, extending entirely around it, which groove branches or divides into two, $d^2$ and $d^3$, for a part of the distance around upon one side of sleeve D, so that either one of these branches forms with the main a continuous groove, as hereinafter described.

Upon the arms or spokes of the wheel C are firmly bolted at regular intervals near its circumference arms $e\ e$, projecting downward and carrying the vertical sleeves $e^2\ e^2$, which are bored out in line with each other to receive the upright piston-rods $e^3$, which slide up and down freely in the sleeves. These rods rest at their lower ends upon an annular or ring-shaped track, $i$, extending entirely around and concentric with the post B, which track is upon the same level all around except under the feeding-chute for the cartridges, as shown in Fig. 2, and a short distance each way therefrom, at which place an elevation of the track $i$ is made for the purpose of raising the rods $e^3$, as hereinafter described. Each rod $e^3$ carries fixed to its upper end a horizontal bar, $e^4$, radial to wheel C, having its ends turned upward, and each end bifurcated to receive and hold a scale-beam, $e^5$, running radially to wheel C. The pivot of this scale-beam is at $e^6$ in the bifurcated hanger $e^7$, which is bolted to the spoke of wheel C, and has the scale-beam $e^5$ passing through its bifurcation, the pivot of the scale-beam extending each way into holes opposite each other in the walls of the hanger $e^7$. This pivot of the scale-beam is made acute-angled on its lower edge, and the holes on each side are adapted to it, as in ordinary scale-beams, to insure sensitiveness in the weighing. The pivot-holes are made considerably larger than the pivot of the scale-beam, so as to allow the latter to be lifted off its pivot-bearing and rest in the supporting-bars $e^4$, as hereinafter described. Each scale-beam has its inner end extending into the groove $d$ in sleeve D, in which it traverses loosely as the wheel C is revolved, and carries the scale-beam with it. To promote this freedom of its movement in the groove $d$, the end of the scale-beam is made a round rod, and does not touch the bottom of groove $d$. Near this inner end each scale-beam $e^5$ has on it a balance-weight, $e^8$, which can be adjusted nearer to or farther from the pivot of the beam by means of a thread cut on the beam, and a correspondingly-threaded hole in the weight through which the beam passes.

On the outer end of each scale-beam is pivoted a fork, $m$, having a counterbalance-weight, $m^2$, to keep its tines in a horizontal plane, as shown. This fork has its tines just wide enough apart to embrace the barrel or cylindrical part of the cartridge to be weighed without allowing the head or flange to pass through. It also has its tines just long enough to reach on each side slightly beyond the diameter of the cartridge transversely to the tines, when the cartridge is seated or placed as far back as possible in the fork. These forks on the ends of the scale-beams are all made to project forward, as shown in Fig. 1.

On one side of the machine, and a short distance apart, are secured to its base the posts $o$ $o'$ under the rim of wheel C. Post $o$ has a wire finger, $o^2$, projecting upward and outward across the path of the cartridge held in the forks $m$ when the outer end of the scale-beam is depressed, while post $o'$ has a like finger, $o^3$, higher up, so as to cross the path of any cartridge carried around by the forks. These parts compose the weighing and assorting part of the machine.

The feeding mechanism is constructed by attaching an upright sleeved standard, $r$, to the base, in which slides up and down a rod, $r^2$, fixed at any desired height by a set-screw, as shown in Fig. 2. The upper end of this rod branches into two arms, $r^3$ $r^4$. Attached to these arms is an inclined chute, conducting the cartridges into the path of the forks $m$, and shown in enlarged view in Fig. 6. This chute is composed of two side pieces, $s$ $s'$, placed so as to incline downward from their outer or feed-in ends, and parallel to a vertical plane passing through the axis of post B. These side pieces have their respective faces opposite to each other parallel and just far enough apart to receive freely the barrel or cylindrical part of the cartridges, as shown in Fig. 6, while the cartridge-flanges on each side rest on top of them. At their lower ends these side pieces are bent at nearly a right angle and into the direction of the path of the forks $m$, still preserving their parallelism to each other and inclining downward. At their inner ends the forks $m$ just pass under and closely to these side pieces. On top of the chute, between these side guides, $s$ $s'$, just at the angle where they turn, as described, is a spring, $s^2$, attached to the side bar, $s'$, and bent downward at its outer end, so as to allow the head of the cartridge to be caught and held from going farther down the chute by the action of gravity, and in this manner the lowermost cartridge in the chute is held directly in the path of the forks $m$ and in position to be picked up between the tines of any one of them as the wheel C revolves.

Attached to the side bar. $s$, is another light spring, $s^3$, which projects over the chute below the spring $s^2$, and serves to prevent any cartridge which may escape from spring $s^2$ from going farther down the chute until taken by one of the forks $m$, and further serves to prevent the cartridge from rising as it is picked up by one of the forks $m$ and to seat it fairly back in position between the tines of the fork. The position of the fork and this feeding-chute to each other is shown in Fig. 2.

The operation of the machine is as follows: The cartridges are fed into the chute, as shown in Fig. 6, and slide down until the foremost one comes under and is caught by spring $s^2$, where it is in position to be picked up by the first fork, $m$, that comes along. The wheel C is then revolved, and a fork, $m$, picks up this foremost cartridge, and another immediately slides down into its place ready for the next cartridge. While the fork is thus picking up the cartridge, its scale-beam $e^5$ is firmly supported in the bifurcated ends of the bar $e^4$, because the piston-rod $e^3$ is passing over the higher portion of the track $i$. The pivot $e^6$ of the scale-beam is thus relieved of all strain or twisting which might injure its sensitive adjustment for weighing the cartridge. It is of course understood that the balance-weight $e^8$ has been previously adjusted to balance the scale-beam $e^5$, so that it will depress the beam with any cartridge which is too light, and be lifted by any which is of or greater than the proper standard weight. As the fork carries the cartridge, after picking it up in the chute, around its path, and just after leaving the feeding-chute, the piston-rod $e^3$ arrives at the depressed part of the track $i$ and drops downward, carrying with it the bar $e^4$, and leaving the scale-beam $e^5$ suspended upon its pivot $e^6$. If then the cartridge is of standard weight, the inner end of the scale-beam will be lifted, and when it reaches the divisions $d^2$ $d^3$ of groove $d$ will traverse the upper branch groove, $d^2$, because the cartridge will overbalance the weight $e^8$. On the contrary, should the cartridge be too light, the weight $e^8$ will overbalance it, and the inner end of the scale-beam will follow the lower branch groove, $d^3$. As the finger $o^2$, attached to post $o$, is so placed as to only intercept cartridges when the scale-beam is depressed and its inner end traverses branch groove $d^2$, it follows that only the cartridges which come up to the standard weight will be thrown out of the forks by coming in contact with that finger. The finger $o^3$, being beyond and higher up than finger $o^2$, comes into contact with the light cartridges and throws them out of the forks at a different place from that at which the heavy ones are thrown out, Thus by proper receptacles at these different places the cartridges are separated and assorted automatically.

The pivoting of the forks $m$ and counterbalancing them by weight $m^2$ is for the purpose of allowing them to adjust themselves to any slight variations in position of the cartridge while picking it up in the chute.

What I claim as new and of my invention is—

1. The combination of the stationary sleeve D, provided with the circumferential groove $d$, having two branches, $d^2$ $d^3$, with the moving scale-beam $e^5$, having its end traversing in said groove, substantially as described.

2. In combination with the rotary moving scale-beam $e^5$, the fork $m$, having its tines projecting forwardly with relation to the path it moves in, substantially as described.

3. In combination with the moving scale-beam, the fork $m$, and the feeding-chute adapted to feed the cartridges thereto one at a time, substantially as described.

4. In combination with the moving fork $m$, the feeding-chute adapted to feed the cartridges thereto one at a time, and formed of side bars, $s$ $s'$, bent so as to conduct the cartridges in an angular or curved path, substantially as described.

5. In combination with the moving fork $m$, the feeding-chute composed of the parallel bars $s$ $s'$ for cartridges, and the retaining-spring $s^2$, substantially as described.

6. In combination with the moving fork $m$, the chute for cartridges composed of the parallel bars $s$ $s'$, and the spring $s^3$, substantially as described.

7. In combination with the moving fork $m$, the chute for cartridges composed of parallel bars $s$ $s'$, and the springs $s^2$ $s^3$, substantially as described.

8. In combination with the cartridge-feeding chute, the scale-beam $e^5$ and pivoted fork $m$, mounted at the end thereof, substantially as described.

9. In combination with the cartridge-feeding chute, the fork $m$, scale-beam $e^5$, vertically-moving arm $e^4$, supporting the scale-beam, and track $i$, connected therewith by suitable mechanism to raise and lower the same, substantially as described.

10. In combination with the rotary disk C, the scale-beam $e^5$, fork $m$, and cartridge-feeding chute, substantially as described.

11. In combination with the rotary disk C, the scale-beam $e^5$, fork $m$, supporting-bar $e^4$, piston-rod $e^3$, and circular track $i$, substantially as described.

12. In combination with the rotary disk C, the scale-beam $e^5$, fork $m$, and cartridge-tripping finger $o^2$, adjusted to discharge the cartridge from the fork, substantially as described.

13. In combination with the rotary disk C, the scale-beam $e^5$, provided with fork $m$, the groove $d$, having branches $d^2$ $d^3$, and the cartridge-tripping fingers $o^2$ $o^3$ adjusted, respectively, to discharge the cartridges while the scale-beam is traversing either of said branches, substantially as described.

14. In combination with the rotary disk C, a scale-beam, $e^5$, provided with cartridge-holder $m$, an automatic cartridge-feeding device therefor placed at one point of the rotation of said disk, and an automatic cartridge-discharging device placed at another point in said rotation, substantially as described.

15. In combination with the scale-beam $e^5$, the groove $d$, with branches $d^2$ $d^3$, the supporting-arm $e^4$, rod $e^3$, and track $i$, substantially as described.

16. In combination with cartridge-carrier $m$, the cartridge-feeding chute provided with the rod $r^2$, and sleeved post $r$, provided with a set-screw for adjusting and fixing the height of the same, substantially as described.

PAUL BUTLER.

Witnesses:
DAVID HALL RICE,
N. P. OCKINGTON.